United States Patent

Ross et al.

[15] 3,696,753
[45] Oct. 10, 1972

[54] GUIDEWAY AND SWITCHING LINEAR MOTOR PROPELLED VEHICLE

[72] Inventors: Howard R. Ross, Grosse Pointe Woods; Lloyd D. Goodrich, Grosse Pointe Park; Norman McQueen, Bloomfield Hills, all of Mich.

[73] Assignee: Transportation Technology, Inc., Madison Heights, Mich.

[22] Filed: Oct. 29, 1969

[21] Appl. No.: 872,020

[52] U.S. Cl. ............104/148 LM, 104/23 FS, 310/13
[51] Int. Cl. ..........B60l 9/18, B60n 1/00, B61b 13/08
[58] Field of Search .....104/148 LM, 148 MS, 23 FS, 104/120, 130, 134, 242; 310/12, 13

[56] References Cited

UNITED STATES PATENTS

| | | | |
|---|---|---|---|
| 3,167,168 | 1/1965 | Park | 104/148 LM |
| 3,500,765 | 3/1970 | Easton et al. | 104/148 LM |
| 1,020,943 | 3/1912 | Bachelet | 104/148 LM |
| 2,794,929 | 6/1957 | Adamski | 104/148 LM |
| 3,190,235 | 6/1965 | Bertin et al. | 104/23 FS |
| 3,225,228 | 12/1965 | Roshala | 104/23 FS |
| 3,242,876 | 3/1966 | Berggren | 104/130 |
| 3,340,822 | 9/1966 | DeLasalle | 104/130 |
| 3,368,496 | 2/1968 | Falk et al. | 104/23 FS |
| 3,513,338 | 5/1970 | Poloujadoff | 104/148 LM |
| 3,516,362 | 6/1970 | Paris et al. | 104/23 FS |

*Primary Examiner*—Drayton E. Hoffman
*Attorney*—McGlynn, Reising, Milton & Ethington

[57] ABSTRACT

A vehicular transportation system including a guideway having lateral walls of ferromagnetic material and linear induction motors on the opposite sides of the vehicle to provide propulsion thrust and selective magnetic attraction to the walls. To negotiate a route fork, the motors on one side are deenergized so the vehicle follows the wall on the other side.

7 Claims, 4 Drawing Figures

PATENTED OCT 10 1972

INVENTORS
Lloyd D. Goodrich,
Norman McQueen, &
BY Howard R. Ross

Barnard, McGlynn & Reising
ATTORNEYS

GUIDEWAY AND SWITCHING LINEAR MOTOR PROPELLED VEHICLE

This invention relates to vehicular transportation systems and more particularly to electromagnetic apparatus for guiding a vehicle through one of two alternate routes appearing at a route fork in a vehicle guide way.

Various proposals have been made for directing vehicles through route forks in enclosed or semienclosed guideways. Such proposals typically involve either steering the vehicle through the route fork by means of a mechanical steering system, or mechanically switching the guideway so that one or the other of the alternate routes simply becomes a continuous extension of the guideway in much the same fashion as a railroad track is switched.

The present invention provides for the guidance of a vehicle through an alternate route fork characterized by diverging guideway walls without the need for mechanical steering systems or mechanical guideway switching systems. In general, this is accomplished by electromagnetically attracting the vehicle to one or the other of the diverging guideway walls at the route fork such that the vehicle is caused to follow that wall which continues into the selected route. Although the adherence of the vehicle to the selected wall is electromagnetically controlled, various other mechanical latches may also be employed for "backup" purposes, if desired.

In accordance with a further feature of the invention, a combined electromagnetic propulsion and route selection system is provided wherein the same electromagnetic means performs both functions. In general, this is accomplished through the use of selectively energizable linear motors having reactive elements of one type disposed along the opposite walls of the guideway and the reactive elements of the other type disposed on opposite sides of the vehicle. During normal operation along a continuous, unbroken guideway section, the motors on both sides of the vehicle and guideway are energized to provide continuous or semicontinuous propulsion thrust as well as substantially balanced magnetic attraction between the vehicle and the guideway walls. At a route fork the motors on one side are deenergized to reduce or eliminate the attractive force between the vehicle and that guideway wall which continues into the unselected route. The motors on the side represented by the guideway wall which continues into the selected route continue to be energized causing the vehicle to continue to be attracted toward that guideway wall, such attraction forces deriving at least principally from the linear propulsion motors. As will become more apparent in the following specification the reactive elements of the linear motors may be disposed such that the relatively passive elements are either in the roadway or on the vehicle in accordance with that design which suggests the greatest advantage.

Various other features and advantages of the invention will become apparent upon reading the following specification which described illustrative embodiments of the invention and is to be taken with the accompanying drawings of which:

Figure 1:
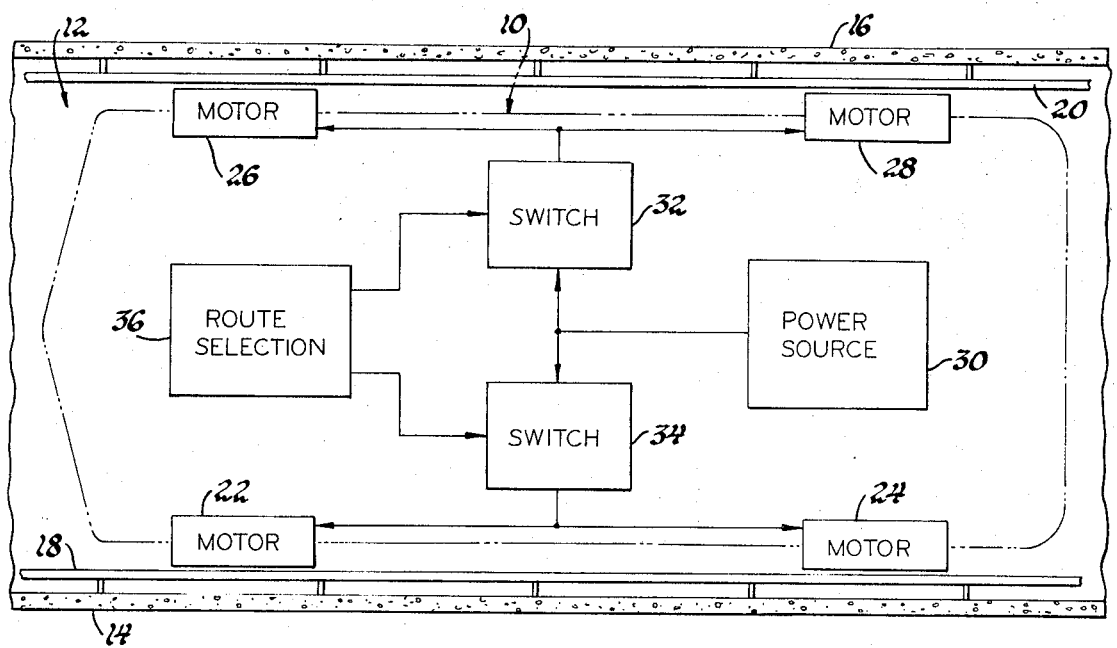
FIG. 1 is a plan view of a vehicle and guideway arrangement together with a block diagram of a first illustrative motor control system.

Referring first to FIG. 1, the illustrated embodiment of the invention is shown to comprise a vehicle 10 which is adapted to travel a single lane guideway 12 having left and right substantially vertical walls 14 and 16, respectively. Attached to wall 14 is a continuous vertical plate 18 of ferromagnetic material which, as will subsequently be described, forms part of an electromagnetic means for guiding and propelling the vehicle 10. Similarly, attached to wall 16 is a second continuous and vertically oriented plate 20 of ferromagnetic material.

Vehicle 10 may be supported relative to the guideway 12 for translation thereover by any of the various well-known mechanisms such as wheels, air pads, or a combination of air pads and wheels. In addition, for propulsion and route selection purposes vehicle 10 is provided on the left side thereof with a pair of linear induction motors 22 and 24 each having a primary winding which produces a linearly translating magnetic field. The primaries of each of the motors 22 and 24 are disposed in parallel facing relationship to the vertical surface of the ferromagnetic plate 18 such that the plate 18 operates as a motor secondary in the well-known manner. Accordingly, a thrust force tending to propel the vehicle 10 in synchronism with the translating magnetic field is developed between the motors 22 and 24 and the plate 18. In addition, a magnetic force of attraction is produced between the motors and the plate 18.

Vehicle 10 is also equipped on the right side thereof with a second pair of linear induction motors 26 and 28 substantially identical in construction and operation to the motors 22 and 24. Motors 26 and 28 have distributed magnetic field windings which are in parallel facing relation to the vertical face of the plate 20 so as to cause plate 20 to operate as an induction motor secondary. Accordingly, the coaction between the motors 26 and 28 and the plate 20 produces a thrust force tending to propel the vehicle 10 along the guideway 12 and also a magnetic force of attraction between the vehicle and the plate 20.

The primaries of the linear induction motors 22, 24, 26, and 28 are energized by an ac voltage derived from a power source 30 which is carried by the vehicle 10. Power source 30 may represent a self-contained, motor-generator combination or a pickup and transformer unit operable to derive power from an outside source via a third rail or trolley. The output of source 30 is connected through controlled switch 32 to the right-hand motors 26 and 28 and through the control switch 34 to the left-hand motors 22 and 24. Each of the control switches 32 and 34 represents a normally closed circuit which is subject to the application of control signals to be selectively open circuited to prevent the transfer of power from the source 30 to the load devices serviced thereby. Signal responsive relays or other equivalent devices may be used for the switch units 32 and 34. The control of the switches 32 and 34 is provided by the route selection unit 36 which is adapted to be controlled either by an operator or by a properly programmed computer to maintain the switches 32 and 34 in the proper condition to energize all of the motors, none of the motors, the motors 22 and 24, or the motors 26 and 28 depending upon the particular mode of control and mode of vehicle operation desired.

Figure 4:
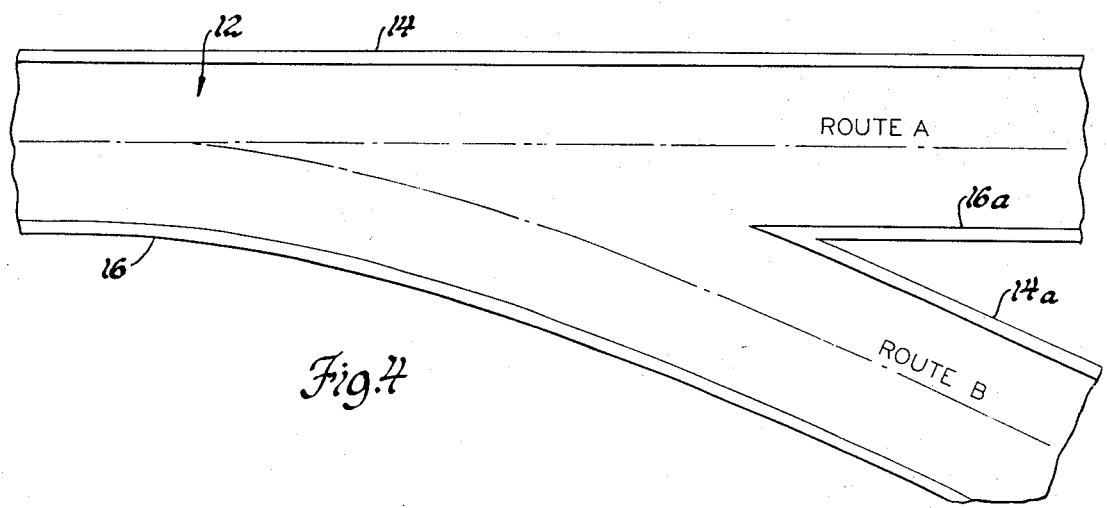

Reference to FIG. 4 illustrates the layout of the guideway 12 in the vicinity of an alternate route fork. Normal vehicle travel is from left to right as seen in FIG. 4. The main route is shown to divide into a substantially straight, continuing route A and an arcuately diverging shunt route B. At the intersection or fork the guideway walls 14 and 16 diverge from one another, the wall 14 continuing on as part of route A and the wall 16 continuing on as part of route B. A wall 16a begins at the fork as the new right-hand vertical guideway wall for route A and wall 14a begins at the fork as the new left-hand guideway wall for route B. Accordingly, a vehicle traveling from left to right having selected to continue on route A must continue to follow and adhere to wall 14 whereas a vehicle having selected route B must continue to follow and adhere to wall 16.

Referring back to FIG. 1, assume the vehicle 10 is approaching a fork such as that represented by FIG. 4 and wishes to follow that alternate route in which wall 14 continues on. Under these circumstances the route selection unit 36 is operated to open switch 32 while leaving switch 34 in the closed condition. Under these circumstances, electrical energy from the source 30 is transmitted through the switch 34 to the primaries of motors 22 and 24, maintaining the propulsive thrust provided by these motors and also maintaining the force of attraction between motors 22 and 24 and the magnetic plate 18. Opening switch 32 deenergizes the primaries of motors 26 and 28 and eliminates both the propulsive force and the attractive force between the motors 26 and 28 and the plate 20. The absence of an attractive force between the motors 26 and 28 and the plate 20 tends to unbalance the lateral force sum on the vehicle 10 and cause the vehicle 10 to follow the plate 18 and, accordingly, the parallel wall 14 through a fork of the type represented in FIG. 4. Once the vehicle 10 is through the fork and back into an area having uniformly spaced sidewalls the switch 32 may be again closed to reenergize the motors 26 and 28.

The switches 32 and 34 are described above as means for completely opening or completely closing circuits between the power source 30 and the various linear induction motors. However, it is to be understood that the switches 32 and 34 may also be operated as proportional control devices to reduce rather than fully eliminate energization of selected motor sets. Moreover, the plates 18 and 20 may be constructed such that the plate material employed in the vicinity of a fork and particularly on the side with the diverging wall of smallest radius of curvature is of a higher permeability material than the remainder of the plate particularly in a substantially straight of the guideway. The increased permeability ferromagnetic material for the plates 18 and 20 in the vicinity of the fork and again on the most rapidly curving plate assist in creating the magnetic force unbalance which is necessary to guide the vehicle 10 through the alternate route fork.

Figure 2:
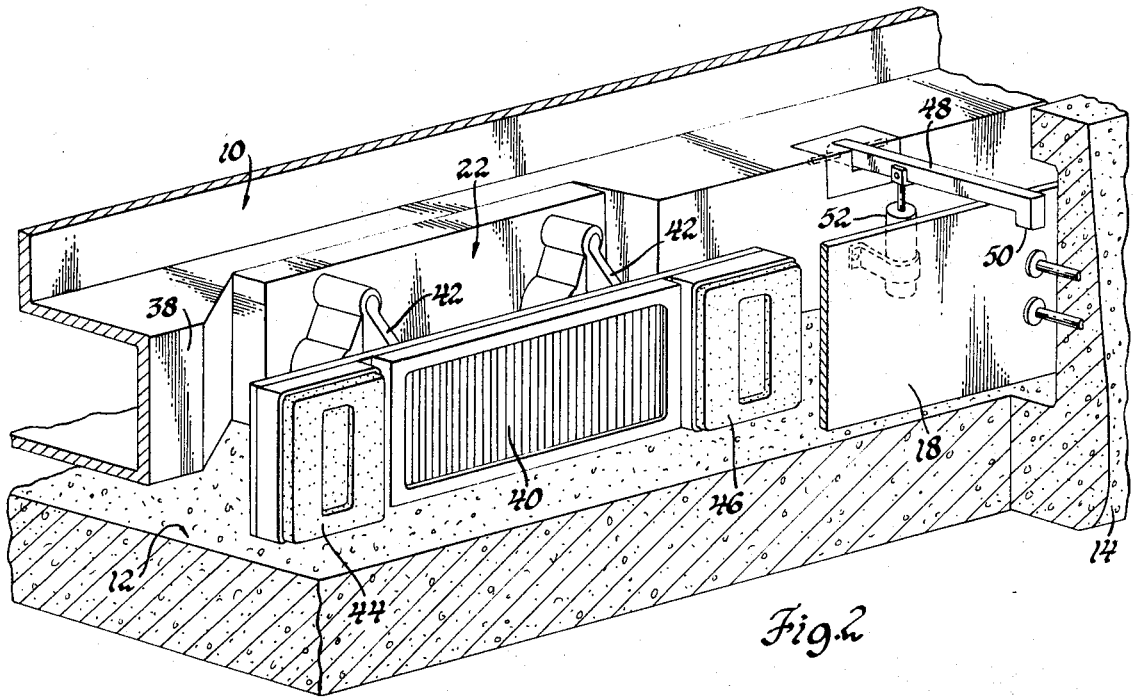
FIG. 2 is a perspective view with parts broken away of a motor and guideway design consistent with the arrangement of FIG. 1.

Looking to FIG. 2 the contruction and arrangement of the motor 22 for the embodiment of FIG. 1 is shown in greater detail. The vehicle 10 is represented by a side section having a rail portion 38 of substantially uniform depth interrupted by a depressed portion in which the motor 22 is disposed. Motor 22 comprises a distributed primary winding 40 which is suspended in the depressed area of the rail 38 by semiresilient suspension struts 42. Disposed adjacent and generally in the same vertical plane as the primary 40, are relatively small, low-pressure air pads 44 and 46 which react with the inside vertical surface of the plate 18 to maintain a suitable spacing between the primary portion 40 and the plate 18. Such air pads as shown at 44 and 46 are well known in the art and it is to be understood that a suitable supply of low-pressure air is connected to the pads to establish the low-pressure air cushion between the primary 40 and the inside surface of the plate 18.

Rearwardly of the motor 22 on the vehicle 10 is a mechanical back-up latch 48 in the form of a rigid arm which is pivotally supported on the vehicle 10 and provided with a depending end portion 50 which rides over the upper edge of the plate 18 to prevent the vehicle 10 from moving laterally away from the plate 18 in the event of failure of the linear induction motor 22. The latch 48 may be provided with a selectively operable solenoid-type retractor 52 which upon command extends the output portion thereof to raise the latch 48 out of interfering relationship with the plate 18. If, for example, the operator commanded the vehicle 10 to follow the right hand wall 16, the mechanical latches on the left side of the vehicle would be operated to permit the left side of the vehicle to depart from the plate 18 and follow the plate 20.

Figure 3:
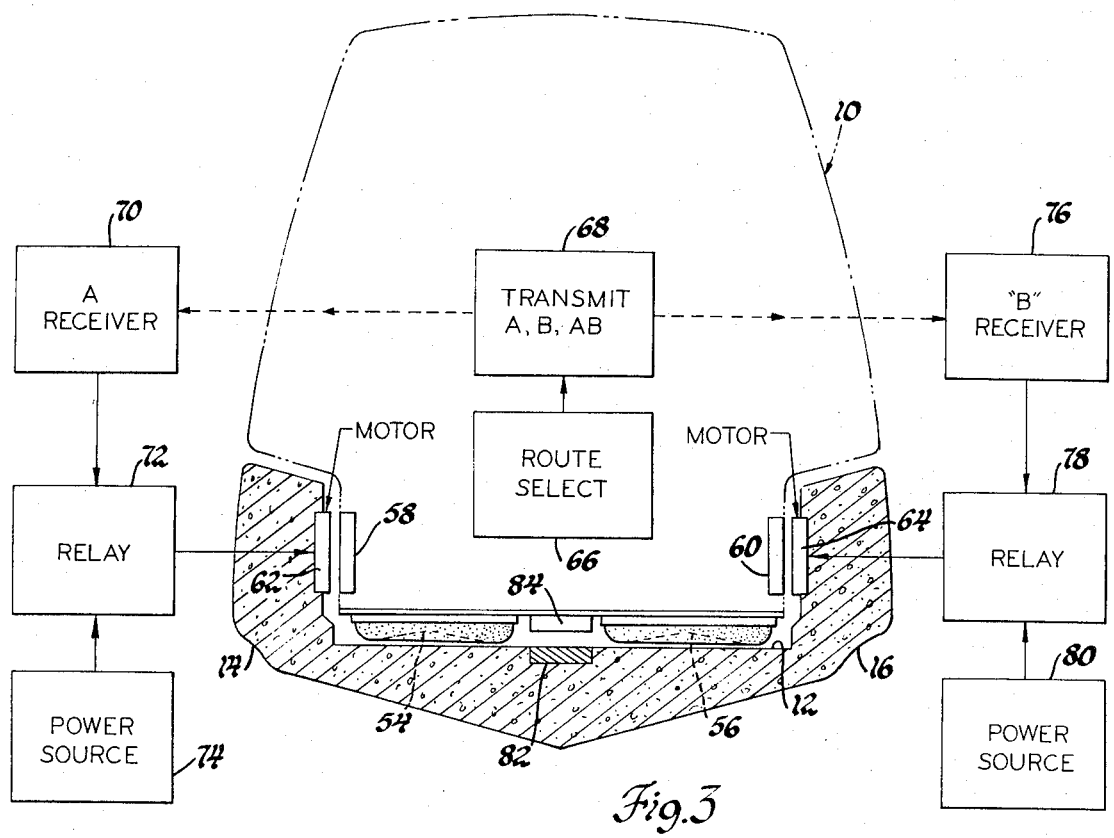
FIG. 3 is a cross-sectional view of a second alternative motor and guideway design illustrating the motor control arrangement in block diagram; and, FIG. 4 is a plan view of a typical guideway fork.

Looking to FIG. 3 an alternative embodiment to the invention is shown to comprise a vehicle 10 adapted to travel a flat, horizontal guideway surface 12 laterally bounded by concrete walls 14 and 16 in substantially the same arrangement as shown in FIG. 1. Vehicle 10 is supported relative to the guideway surface 12 by laterally spaced low-pressure air pads 54 and 56, as shown. Mounted on the left side of the vehicle as seen in FIG. 3 is a substantially continuous and vertically oriented ferromagnetic plate 58. Similarly, on the right side of the vehicle is a second continuous, vertically oriented ferromagnetic plate 60. Disposed at varying intervals in the guideway wall 14 is a linear induction motor primary 62 which coacts with the plate 50 when in parallel facing relationship therewith to provide a thrust force and an attractive force between the vehicle 10 and the guideway wall 14. Similarly, mounted in the inside surface of guideway wall 16 is a second set of spaced linear induction motor primary 64 which when in parallel facing relationship to the plate 60 coact therewith to provide thrust and attractive forces. In the preferred arrangement, the motor primary 62 and 64 are located laterally opposite one another to impart propulsive thrust forces to the vehicle 10 in pulse form at a frequency determined by the spacing of the motors along the guideway walls and the speed at which the vehicle 10 passes them. The attractive forces between the motors 62 and 64 and the vehicle mounted plates 58 and 60 is normally balanced but may be unbalanced in the vicinity of a route fork to cause the vehicle 10 to follow one or the other of the guideway walls 14 and 16. In the vicinity of the fork, a substantially constant force of attraction must be generated and, therefore, it is to be understood that in the curving guideway wall area the motor primaries 62 and 64 are substantially continuous to provide a continuous, linearly moving magnetic field pattern.

To control the motors 62 and 64 from the vehicle 10, a route selection unit 66 which, subject to operator control, is connected to an FM transmitter 68 to transmit one of three frequency modulated carrier signals. The first such signal is adapted to be received by a tuned receiver 70 disposed at periodic intervals along the guideway 12. The receiver 70 has an output which is connected to control a relay 72 which is disposed between an ac power source 74 and the motor 62. Whenever receiver 70 receives a signal from the transmitter 68, the relay switch 72 is closed to permit power to flow from the source 74 to the motor primary 62.

The second output signal frequency of transmitter 68 is adapted to be received by a tuned receiver 76 having an output connected to control the relay switch 78 which is disposed between a power source 80 and the motor primary 64. Whenever receiver 76 is actuated by a signal from transmitter 68, the relay switch 78 is closed to permit power to flow from the source 80 to the motor primary 64.

The third signal from transmitter 68 is a combination of the frequencies which operate receivers 70 and 76. This third signal is normally transmitted when the vehicle 10 is proceeding through an uninterrupted area of the guideway 12. However, when a route intersection is encountered, one or the other of the signal frequencies will be eliminated to cause the vehicle 10 to adhere to and follow the guideway wall in which the continuously energized motor primaries are disposed.

As shown in FIG. 3, an induction motor set comprising a primary 82 disposed in the center of the guideway 12 and a ferromagnetic secondary 84 disposed on the bottom surface of the vehicle 10 may be provided to produce auxiliary propulsive forces on the vehicle 10. Such additional propulsive means may be employed for auxiliary propulsion as a backup system, for auxiliary power to negotiate steep grades, or as the sole propulsive thrust source. In the latter instance, the induction motor 62 and 64 may be replaced with simple electromagnets either on the vehicle end or in the guideway walls 14 and 16 to produce a force of magnetic attraction between the vehicle 10 and a selected one of the walls 14 and 16.

It will be understood that various combinations and reversiles of the apparatus described above with reference to the illustrated embodiments are possible and will occur to those skilled in the art. Accordingly, the foregoing specification is not to be construed in a limiting sense.

The embodiments of the invention in which an exclusive property or privilege is claimed are defined as follows:

1. A transportation system comprising: a vehicle guideway including a main line and a diverging fork line; said main line and fork line each having upstanding side walls, one side wall of said main line being interrupted at the intersection with said fork line with one portion thereof merging with one side wall of said fork line and the other portion thereof intersecting the other side wall of said fork line; a vehicle in said guideway between said upstanding side walls; ground support means on said vehicle for supporting said vehicle above the surface of said guideway; electromagnetic means including cooperating magnetically attaching and attractive elements on said vehicle and guideway side walls, the vehicle elements including at least a pair of elements mounted on opposite sides of said vehicle and the guideway elements extending along each side wall; means for selectively energizing and deenergizing said cooperating elements to steer the vehicle along a selected one of the main line and fork line at the intersection thereof; and lateral support means on opposite sides of said vehicle reacting against said side walls for maintaining a spacing between said cooperating elements to prevent sliding contact therebetween as the vehicle travels along the guideway.

2. A system as claimed in claim 1, wherein each of said vehicle elements comprises an electromagnet and each of said guideway elements comprise a continuous plate of ferromagnetic material.

3. A system as claimed in claim 2 wherein said electromagnetic means comprises a pair of linear motors, and each of said vehicle elements comprises a substantially vertically oriented linear motor primary and each of said guideway elements comprises a linear motor secondary coacting with one of the primaries.

4. A system as defined in claim 2, wherein the plates are constructed to have a relatively higher magnetic permeability in the vicinity of the fork than elsewhere along the guideway.

5. A system as claimed in claim 1, wherein said lateral support means comprises at least one air bearing located on each side of said vehicle and coacting against the adjacent side wall of the guideway.

6. A system as defined in claim 1, wherein the electromagnetic means produces a linearly moving, magnetic field for propelling the vehicle along the guideway.

7. A system as defined in claim 1 including mechanical means for selectively latching the vehicle to the guideway walls.

* * * * *